US012169252B2

(12) United States Patent
Droz et al.

(10) Patent No.: US 12,169,252 B2
(45) Date of Patent: *Dec. 17, 2024

(54) PULSE ENERGY PLAN FOR LIGHT DETECTION AND RANGING (LIDAR) DEVICES BASED ON AREAS OF INTEREST AND THERMAL BUDGETS

(71) Applicant: Waymo LLC, Mountain View, CA (US)

(72) Inventors: Pierre-Yves Droz, Los Altos, CA (US); Caner Onal, Palo Alto, CA (US); Simon Ellgas, San Jose, CA (US); Augusto Tazzoli, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,039

(22) Filed: Jun. 13, 2023

(65) Prior Publication Data
US 2023/0324521 A1    Oct. 12, 2023

Related U.S. Application Data

(63) Continuation of application No. 16/838,581, filed on Apr. 2, 2020, now Pat. No. 11,740,333.

(Continued)

(51) Int. Cl.
*G01S 7/484* (2006.01)
*G01S 7/497* (2006.01)
(Continued)

(52) U.S. Cl.
CPC ............. *G01S 7/484* (2013.01); *G01S 7/497* (2013.01); *G01S 17/42* (2013.01); *G01S 17/931* (2020.01)

(58) Field of Classification Search
CPC .......... H05K 2201/10121; G01S 17/42; G01S 17/931; G01S 7/4868; G02B 26/10
See application file for complete search history.

(56) References Cited

U.S. PATENT DOCUMENTS 5,831,717 A    11/1998    Ikebuchi
7,787,134 B2    8/2010    Kohnen et al.
(Continued)

FOREIGN PATENT DOCUMENTS

CN    1770211 A    5/2006
CN    1834686 A    9/2006
(Continued)

OTHER PUBLICATIONS

International Search Report and Written Opinion of International Application No. PCT/US2020/061448, mailed Mar. 16, 2021.
(Continued)

*Primary Examiner* — Mirza F Alam
(74) *Attorney, Agent, or Firm* — McDonnell Boehnen Hulbert & Berghoff LLP

(57) ABSTRACT

Example embodiments relate to pulse energy plans for light detection and ranging (lidar) devices based on areas of interest and thermal budgets. An example lidar device includes a plurality of light emitters configured to emit light pulses into an environment in a plurality of different emission directions. The lidar device also includes circuitry configured to power the plurality of light emitters. Further, the lidar device includes a plurality of detectors configured to detect reflections of light pulses emitted by the plurality of light emitters. In addition, the lidar device includes a controller configured to (i) determine a pulse energy plan based on one or more regions of interest in the environment and a thermal budget and (ii) control the circuitry based on the pulse energy plan. The pulse energy plan specifies a
(Continued)

pulse energy level for each light pulse emitted by each light emitter in the plurality of light emitters.

20 Claims, 14 Drawing Sheets

Related U.S. Application Data

(60) Provisional application No. 62/943,650, filed on Dec. 4, 2019.

(51) Int. Cl.
*G01S 17/42* (2006.01)
*G01S 17/931* (2020.01)

(56) References Cited

U.S. PATENT DOCUMENTS

| | | | |
|---|---|---|---|
| 8,736,818 B2 | 5/2014 | Weimer et al. | |
| 8,767,190 B2 | 7/2014 | Hall | |
| 8,818,609 B1 | 8/2014 | Boyko et al. | |
| 8,842,015 B2 | 9/2014 | Scott | |
| 9,091,535 B2 | 7/2015 | Baeg et al. | |
| 9,383,753 B1 | 7/2016 | Templeton et al. | |
| 9,470,520 B2 | 10/2016 | Schwarz et al. | |
| 9,983,297 B2 | 5/2018 | Hall et al. | |
| 10,036,801 B2 | 7/2018 | Retterath et al. | |
| 10,114,111 B2 | 10/2018 | Russell et al. | |
| 10,191,156 B2 | 1/2019 | Steinberg et al. | |
| 10,203,399 B2 | 2/2019 | Retterath et al. | |
| 10,209,359 B2 | 2/2019 | Russell et al. | |
| 10,241,198 B2 | 3/2019 | LaChapelle et al. | |
| 10,267,899 B2 | 4/2019 | Weed et al. | |
| 10,317,532 B1 | 6/2019 | Jannson et al. | |
| 10,942,272 B2 | 3/2021 | Droz et al. | |
| 2006/0132752 A1 | 6/2006 | Kane | |
| 2006/0145062 A1 | 7/2006 | Boehlau et al. | |
| 2006/0215148 A1 | 9/2006 | Yamaguchi et al. | |
| 2012/0038903 A1 | 2/2012 | Weimer et al. | |
| 2013/0044309 A1 | 2/2013 | Dakin et al. | |
| 2013/0325243 A1 | 12/2013 | Lipkowski et al. | |
| 2014/0233942 A1 | 8/2014 | Kanter | |
| 2015/0091374 A1 | 4/2015 | Lenius et al. | |
| 2015/0185313 A1 | 7/2015 | Zhu | |
| 2016/0071416 A1 | 3/2016 | Kim et al. | |
| 2016/0084651 A1 | 3/2016 | Hinderling et al. | |
| 2016/0223654 A1 | 8/2016 | Sparbert et al. | |
| 2016/0245919 A1* | 8/2016 | Kalscheur | G01S 7/4817 |
| 2016/0274589 A1 | 9/2016 | Templeton et al. | |
| 2016/0291134 A1 | 10/2016 | Droz et al. | |
| 2017/0269197 A1 | 9/2017 | Hall et al. | |
| 2017/0307736 A1* | 10/2017 | Donovan | G01S 7/4815 |
| 2018/0081061 A1 | 3/2018 | Mandai et al. | |
| 2018/0100928 A1 | 4/2018 | Keilaf et al. | |
| 2018/0120424 A1 | 5/2018 | Eshel et al. | |
| 2018/0143308 A1 | 5/2018 | Vlaiko et al. | |
| 2018/0143324 A1* | 5/2018 | Keilaf | G01S 7/4812 |
| 2018/0164439 A1 | 6/2018 | Droz et al. | |
| 2018/0254607 A1 | 9/2018 | Kitano | |
| 2018/0259645 A1 | 9/2018 | Shu et al. | |
| 2018/0284237 A1 | 10/2018 | Campbell et al. | |
| 2018/0284244 A1 | 10/2018 | Russell et al. | |
| 2018/0284245 A1* | 10/2018 | LaChapelle | G01S 7/4861 |
| 2018/0284278 A1* | 10/2018 | Russell | G01S 17/26 |
| 2019/0064331 A1 | 2/2019 | Russell et al. | |
| 2019/0079172 A1 | 3/2019 | Field et al. | |
| 2019/0179028 A1 | 7/2019 | Pacala et al. | |
| 2019/0212450 A1 | 7/2019 | Steinberg et al. | |
| 2019/0293770 A1 | 9/2019 | Subasingha et al. | |
| 2019/0361092 A1 | 11/2019 | Hall et al. | |
| 2020/0141716 A1 | 5/2020 | Droz et al. | |
| 2021/0165097 A1 | 6/2021 | Droz et al. | |

FOREIGN PATENT DOCUMENTS

| | | |
|---|---|---|
| CN | 105403893 A | 3/2016 |
| CN | 106093957 A | 11/2016 |
| JP | S62184381 A | 8/1987 |
| JP | 2000241546 A | 9/2000 |
| JP | 2006500598 A | 1/2006 |
| JP | 2007139594 A | 6/2007 |
| JP | 2012174006 A | 9/2012 |
| JP | 2014533350 A | 12/2014 |
| JP | 2015135273 A | 7/2015 |
| JP | 201657141 A | 4/2016 |
| JP | 2016090268 A | 5/2016 |
| JP | 2016205962 A | 12/2016 |
| JP | 2017173298 A | 9/2017 |
| JP | 2018019044 A | 2/2018 |
| JP | 2018054539 A | 4/2018 |
| JP | 2019164121 A | 9/2019 |
| KR | 1020190046557 A | 5/2019 |
| WO | 02101340 A2 | 12/2002 |
| WO | 2016033036 A2 | 3/2016 |
| WO | 2017060965 A1 | 4/2017 |
| WO | 2018055449 A2 | 3/2018 |
| WO | 2018055513 A2 | 3/2018 |
| WO | 2018160886 A1 | 9/2018 |
| WO | 2019197894 A1 | 10/2019 |

OTHER PUBLICATIONS

International Search Report and Written Opinion for PCT/US2020/062729 mailed Mar. 24, 2021.

International Search Report and Written Opinion for PCT/US2017/066043 mailed Mar. 29, 2018.

* cited by examiner

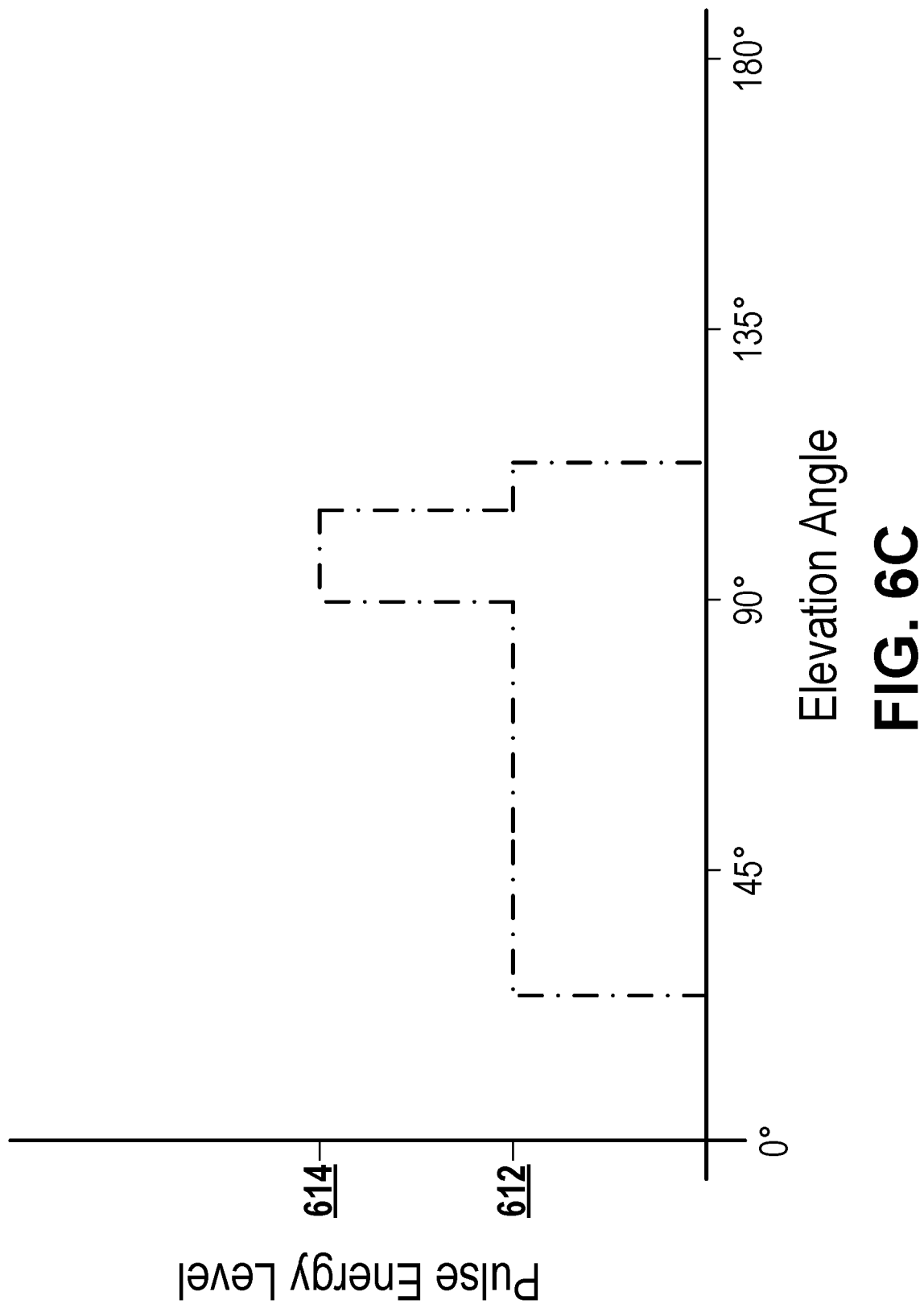

PULSE ENERGY PLAN FOR LIGHT DETECTION AND RANGING (LIDAR) DEVICES BASED ON AREAS OF INTEREST AND THERMAL BUDGETS

CROSS-REFERENCE TO RELATED APPLICATIONS

The present application is a continuation application of Non-Provisional patent application Ser. No. 16/838,581, filed with the U.S. Patent and Trademark Office on Apr. 2, 2020; which claims priority to Provisional Patent Application No. 62/943,650, filed with the U.S. Patent and Trademark Office on Dec. 4, 2019. The contents of each of which are hereby incorporated by reference in their entireties.

BACKGROUND

Unless otherwise indicated herein, the materials described in this section are not prior art to the claims in this application and are not admitted to be prior art by inclusion in this section.

A light detection and ranging (lidar) device can determine distances to environmental features while scanning through a scene to collect data that can be assembled into a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

SUMMARY

The disclosure relates to a pulse energy plan for lidar devices based on areas of interest and thermal budgets. As a lidar device scans an environment (e.g., to generate a point cloud), the lidar device may generate excess heat (e.g., from inefficiencies in the light emitters of the lidar device). If too much excess heat is produced, such heat can have detrimental effects on the lidar device components. In order to prevent potential degradation to the lidar device, power provided to the light emitters in the lidar device may be allocated according to a pulse energy plan, thereby limiting the amount of excess heat produced. One method of allocating the amount of power provided to the light emitters is to identify regions of interest in the environment surrounding the lidar device and then provide greater power to the light emitters when the lidar device is scanning those regions of interest.

In one aspect, a lidar device is provided. The lidar device includes a plurality of light emitters configured to emit light pulses into an environment of the lidar device in a plurality of different emission directions. The lidar device also includes circuitry configured to power the plurality of light emitters. Further, the lidar device includes a plurality of detectors. Each detector in the plurality of detectors is configured to detect reflections of light pulses emitted by a corresponding light emitter in the plurality of light emitters and received from the environment of the lidar device. Additionally, the lidar device includes a controller configured to (i) determine a pulse energy plan based on one or more regions of interest in the environment of the lidar device and a thermal budget. The pulse energy plan specifies a pulse energy level for each light pulse emitted by each light emitter in the plurality of light emitters and (ii) control the circuitry based on the pulse energy plan.

In another aspect, a method is provided. The method includes determining, using a controller of a light detection and ranging (lidar) device, a pulse energy plan based on one or more regions of interest in an environment of the lidar device and a thermal budget. The method also includes controlling, by the controller, circuitry of the lidar device configured to power a plurality of light emitters according to the pulse energy plan. Further, the method includes emitting, from each light emitter in the plurality of light emitters, a light pulse into the environment of the lidar device in a plurality of different emission directions relative to the lidar device. A pulse energy level for each light pulse emitted by each light emitter in the plurality of light emitters is specified by the pulse energy plan. Additionally, the method includes detecting, by a plurality of detectors of the lidar device, each detector corresponding to a light emitter in the plurality of light emitters, reflections of the light pulses emitted by the corresponding light emitters and received from the environment of the lidar device.

In an additional aspect, a non-transitory, computer-readable medium having instructions stored therein is provided. The instructions, when executed by a processor, perform a method. The method includes determining a pulse energy plan based on one or more regions of interest in an environment of a light detection and ranging (lidar) device and a thermal budget. The method also includes controlling circuitry of the lidar device configured to power a plurality of light emitters according to the pulse energy plan. Further, the method includes causing each light emitter in the plurality of light emitters to emit a light pulse into the environment of the lidar device in a plurality of different emission directions relative to the lidar device. A pulse energy level for each light pulse emitted by each light emitter in the plurality of light emitters is specified by the pulse energy plan. Additionally, the method includes receiving, from each detector in a plurality of detectors of the lidar device, signals corresponding to detected reflections of the light pulses emitted by the plurality of light emitters and received from the environment of the lidar device. Each detector of the plurality of detectors corresponds to a light emitter in the plurality of light emitters.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 6C is a plot of a pulse energy plan, according to example embodiments.

DETAILED DESCRIPTION

Figure 1:
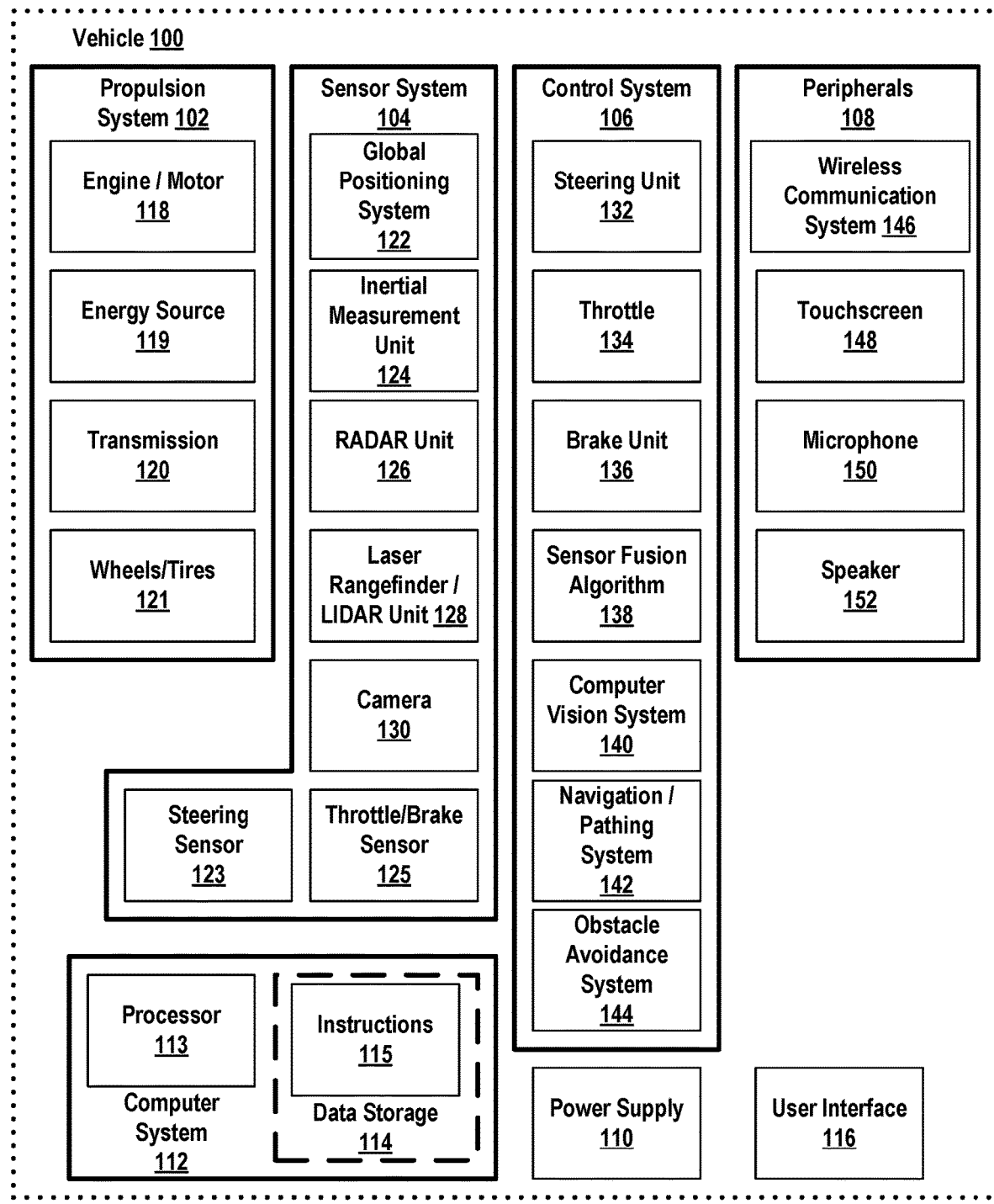
FIG. 1 is a functional block diagram illustrating a vehicle, according to example embodiments.
Figure 2A:
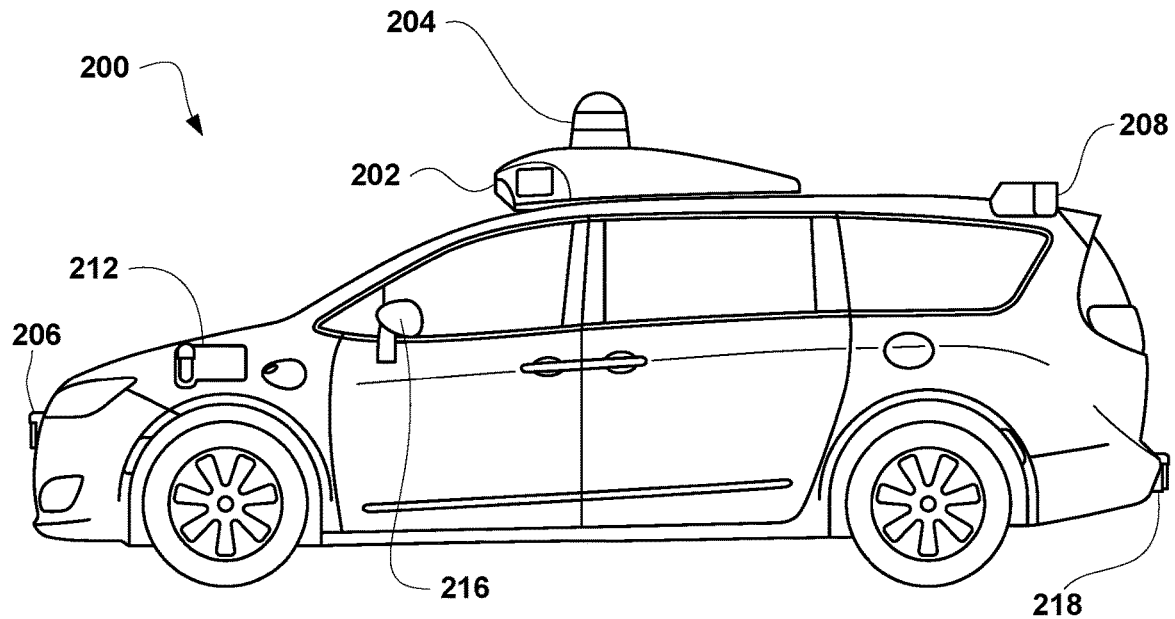
FIG. 2A is an illustration of a physical configuration of a vehicle, according to example embodiments.
Figure 2B:
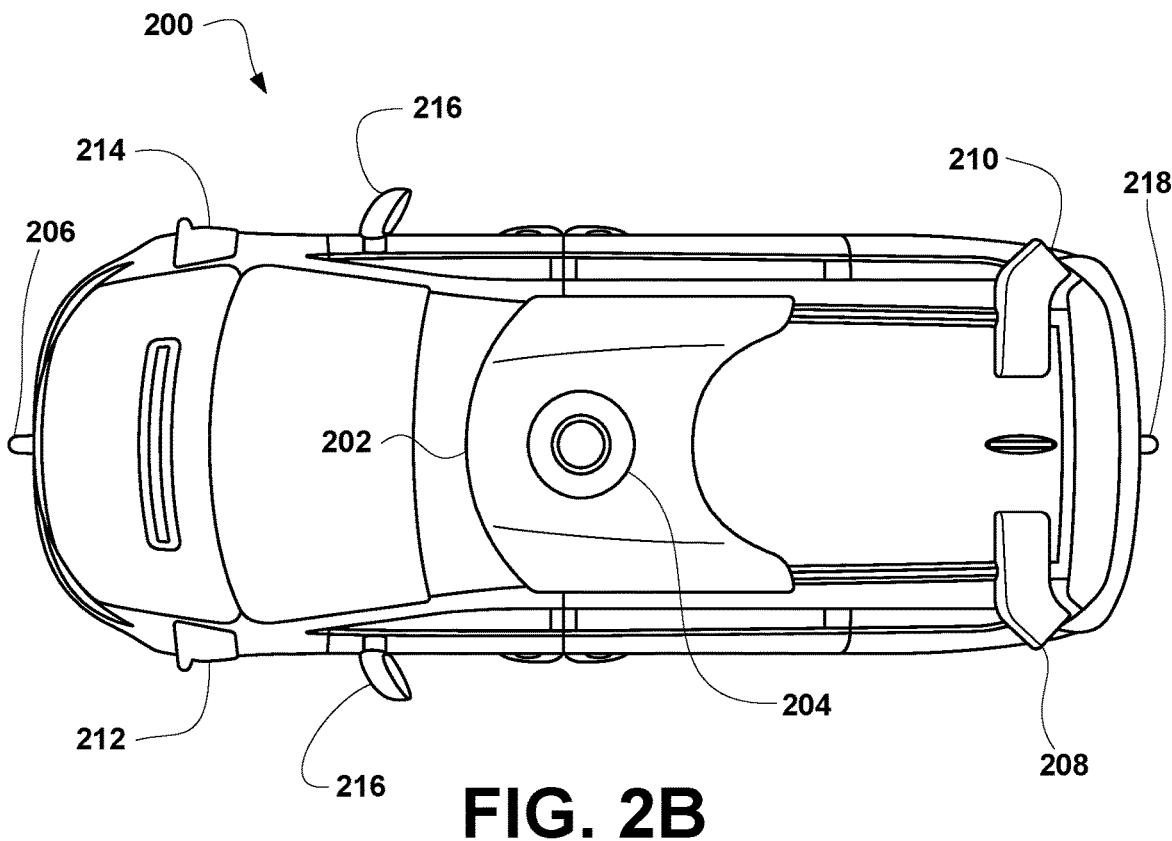
FIG. 2B is an illustration of a physical configuration of a vehicle, according to example embodiments.
Figure 2C:
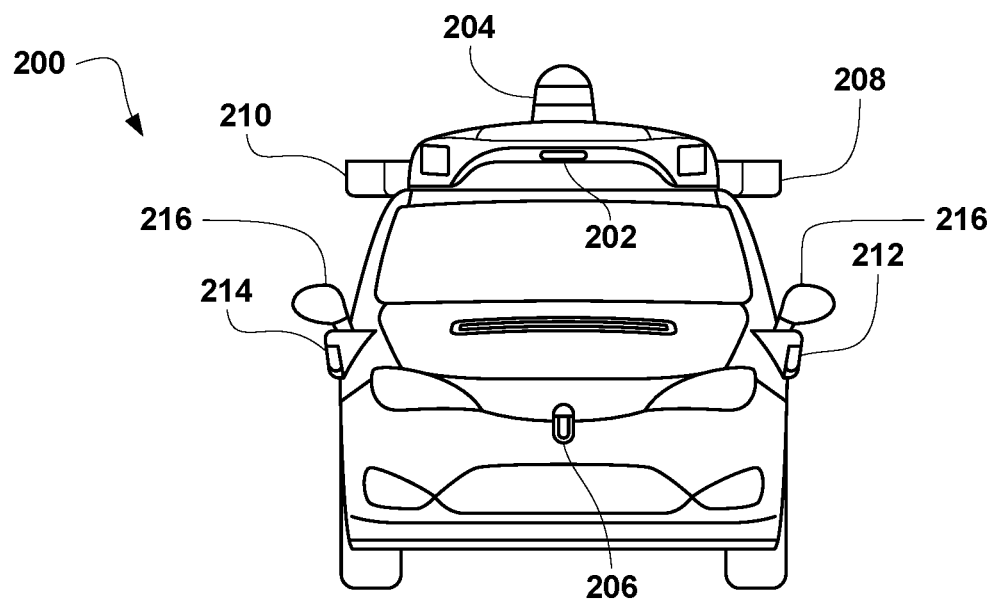
FIG. 2C is an illustration of a physical configuration of a vehicle, according to example embodiments.
Figure 2D:
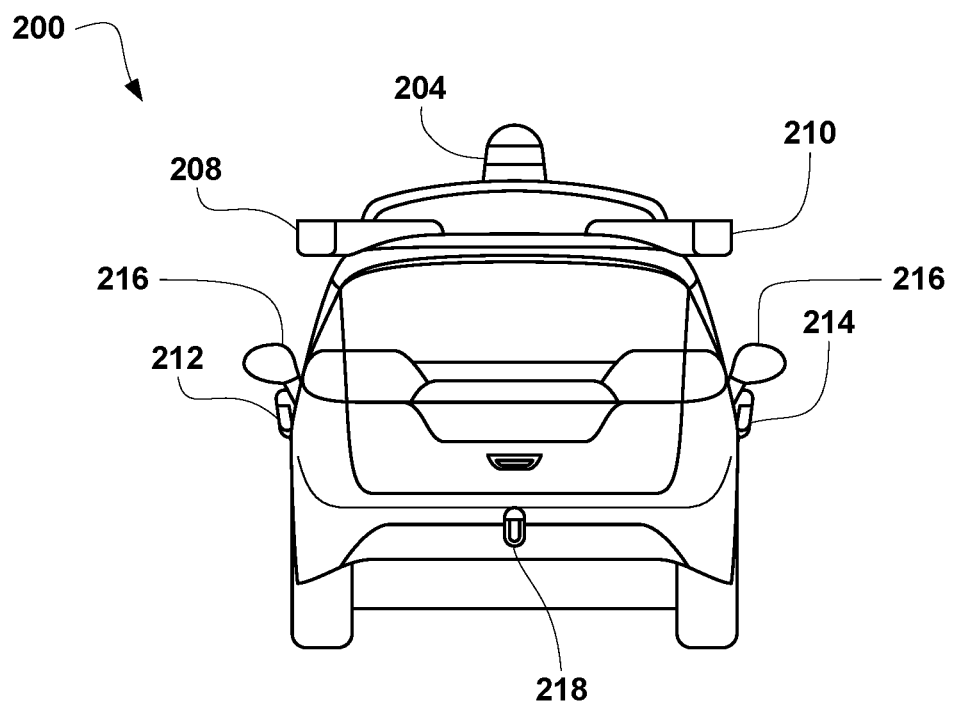
FIG. 2D is an illustration of a physical configuration of a vehicle, according to example embodiments.
Figure 2E:
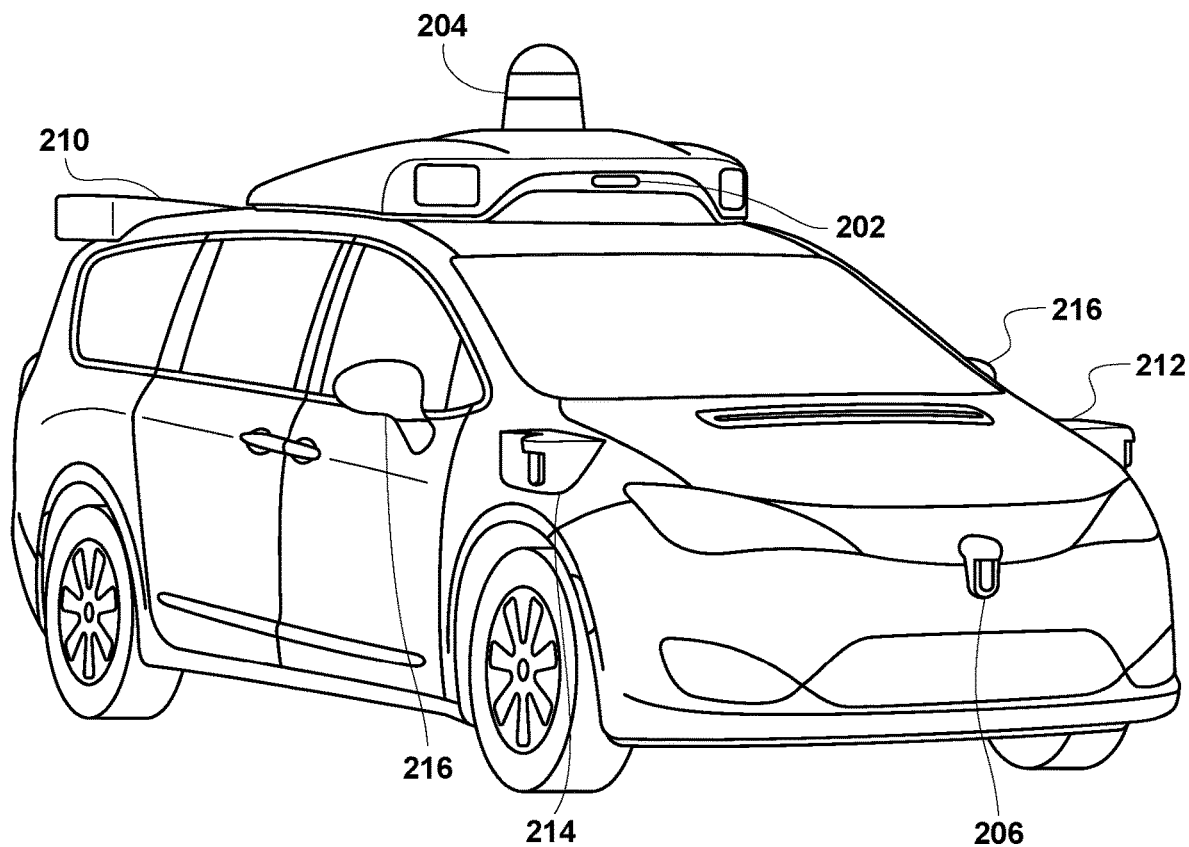
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

Herein, the terms "transmitter," "emitter," and "light emitter" may be used interchangeably, based on context. Likewise, the terms "receiver" and "detector" may also be used interchangeably, based on context.

I. Overview

In example embodiments, lidar devices may include one or more transmitters (e.g., laser diodes) and one or more receivers (e.g., light detectors). For example, an example lidar device may include an array of laser transmitters and a corresponding array of light detectors. Such arrays may illuminate objects in the scene and receive reflected light from objects in the scene so as to collect data that may be used to generate a point cloud for a particular angular field of view relative to the lidar device. Further, to generate a point cloud with an enhanced field of view (e.g., a complete 360° field of view), the array of transmitters and the corresponding array of receivers may send and receive light at predetermined times and/or locations within that enhanced field of view. For example, the lidar may arrange the array of transmitters and the corresponding array of receivers around the vertical axis such that light is transmitted and received in multiple directions around the 360° field of view simultaneously. As another example, a lidar may be rotated about a central axis to transmit/receive multiple sets of data. The data can be used to form point clouds that can be composited to generate the enhanced field of view. In some embodiments, the arrays of transmitters/corresponding receivers may not have uniform density. For example, central portions of the arrays might have an increased density of transmitters/receivers when compared to the periphery of the arrays. This may allow for increased resolution in certain portions of the point cloud of the field of view (e.g., a central region of the point cloud may have higher density than peripheral regions of the point cloud). The increased resolution may correspond to regions of interest of a surrounding scene. For example, in a vehicle operating in an autonomous mode, objects in front of the vehicle may be of increased interest when compared to objects above or below the vehicle. As another example, objects at certain elevations (e.g., along the horizon) or specific locations on a predetermined map (e.g., near a street corner that includes a pedestrian crosswalk), or specific locations relative to the car may be of increased interest. The map may be, for example, a two-dimensional or three-dimensional map.

The transmitters may use a predefined transmit power to illuminate objects in the environment. Because of electromagnetic losses in the environment, such a transmit power may only allow for observation of objects at a maximum distance. For example, because of beam divergence and/or attenuation in the atmosphere, a transmitted beam, when reflected from an object that is more than the maximum distance away from the lidar device, may not have sufficient power to be detected by a corresponding receiver. Hence, the predefined transmit power may be chosen based on a desired detectability range of the lidar device. Additionally or alternatively, the predefined transmit power may be chosen based on thermal constraints within the lidar device (e.g., such that the amount of heat generated by the transmitters does not degrade the lidar device itself) and/or other constraints.

It may be desirable, however, to have increased range in certain regions of interest. For example, a vehicle operating in an autonomous mode may have access to map data or other types of data that indicate specific regions of interest where objects beyond the maximum distance defined by the predefined transmit power may be present. Additionally or alternatively, if the lidar device is rotated about an axis, there may be specific regions of interest where an increased range is desired (e.g., when the array of transmitters is oriented such that a region in front or to the sides of a vehicle is being illuminated, as opposed to a region behind a vehicle). For such regions of interest, the power of the transmitters may be modulated such that it is higher than the predefined transmit power, thereby increasing the range of the lidar device in those regions. Such transmit power modulation may be performed based on the azimuthal orientation of the lidar device (e.g., from 0° to 60° about the central axis the transmit power is enhanced, and from 60° to 360° the transmit power is equal to the predefined transmit power). Additionally or alternatively, such transmit power modulation may be performed on a transmitter by transmitter basis within the array of transmitters. For example, the transmitters used to illuminate objects at angles with higher altitudes relative to the lidar device or the ground may have an increased transmit power, while the remaining transmitters use the predefined transmit power. Additionally or alternatively, such transmit power modulation may be performed consistently, at variable times, or dynamically based on other data, such as other sensor data (e.g., a light sensor configured to measure ambient light intensity, such as solar intensity), map data (e.g., two-dimensional or three-dimensional map data), data related to season, date, and/or time of day (e.g., springtime, holiday, or noon), data relating to location and/or event (e.g., highways segments with long straightaways and/or the end of a concert or sporting event), data from other fleet vehicles, data from a remote server, historical data (e.g., a time of day or year with historically common people/animal crossing at a certain location), data relating to a cooling device within the lidar device (e.g., data relating to a degree of cooling performed by a thermoelectric cooler of the lidar device), etc. As such, using enhanced transmit power for certain regions of interest can simulate a steerable long range lidar device without requiring additional mechanical components.

However, the thermal limitations of the lidar device may still come into play. Hence, there may be a thermal budget that can be distributed across the regions of interest, meaning that transmit powers above the predefined transmit power can only be used for limited regions of interest in the surrounding environment without causing detrimental effects within the lidar device. As such, the thermal budget may be divided among the regions of interest and the desired ranges for the various regions of interest.

Still further, in some embodiments, the regions of interest that could benefit from enhanced transmit power may be defined based on weather conditions (e.g., in cases of snow, enhanced transmit power may be region in a region directly in front of the lidar device) or terrain (e.g., when the lidar device is traveling up or downhill, transmitters oriented at high or low altitudinal angles within the array of transmitters may benefit from increased transmit power).

II. Example Systems

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as GPS 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/lidar 128 may include one or more photodetectors. Such photodetectors may be especially sensitive detectors (e.g., avalanche photodiodes (APDs)). In some examples, such photodetectors may be capable of detecting single photons (e.g., SPADs). Further, such photodetectors can be arranged (e.g., through an electrical connection in series) into an array (e.g., as in a SiPM). In some examples, the one or more photodetectors are Geiger-mode operated devices and the lidar includes subcomponents designed for such Geiger-mode operation.

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216, 218 at which the radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208, 210 and/or the first and second lidar units 204, 206 can actively scan the surrounding environment for the presence of potential obstacles and can be similar to the radar 126 and/or laser rangefinder/lidar 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, inertial sensors, humidity sensors, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths and/or elevations. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first lidar/radar unit 212 and the second lidar/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
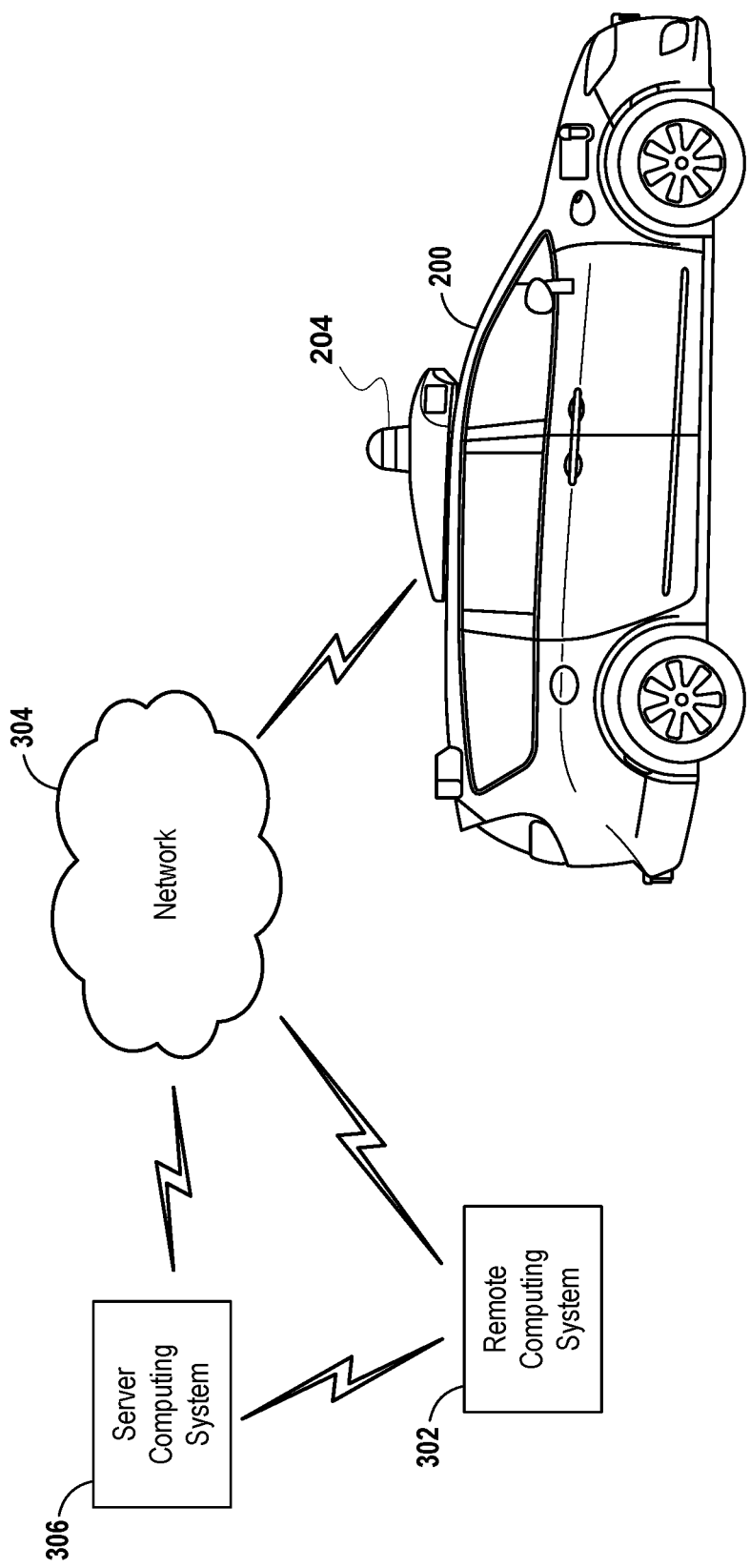
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., infrared light) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
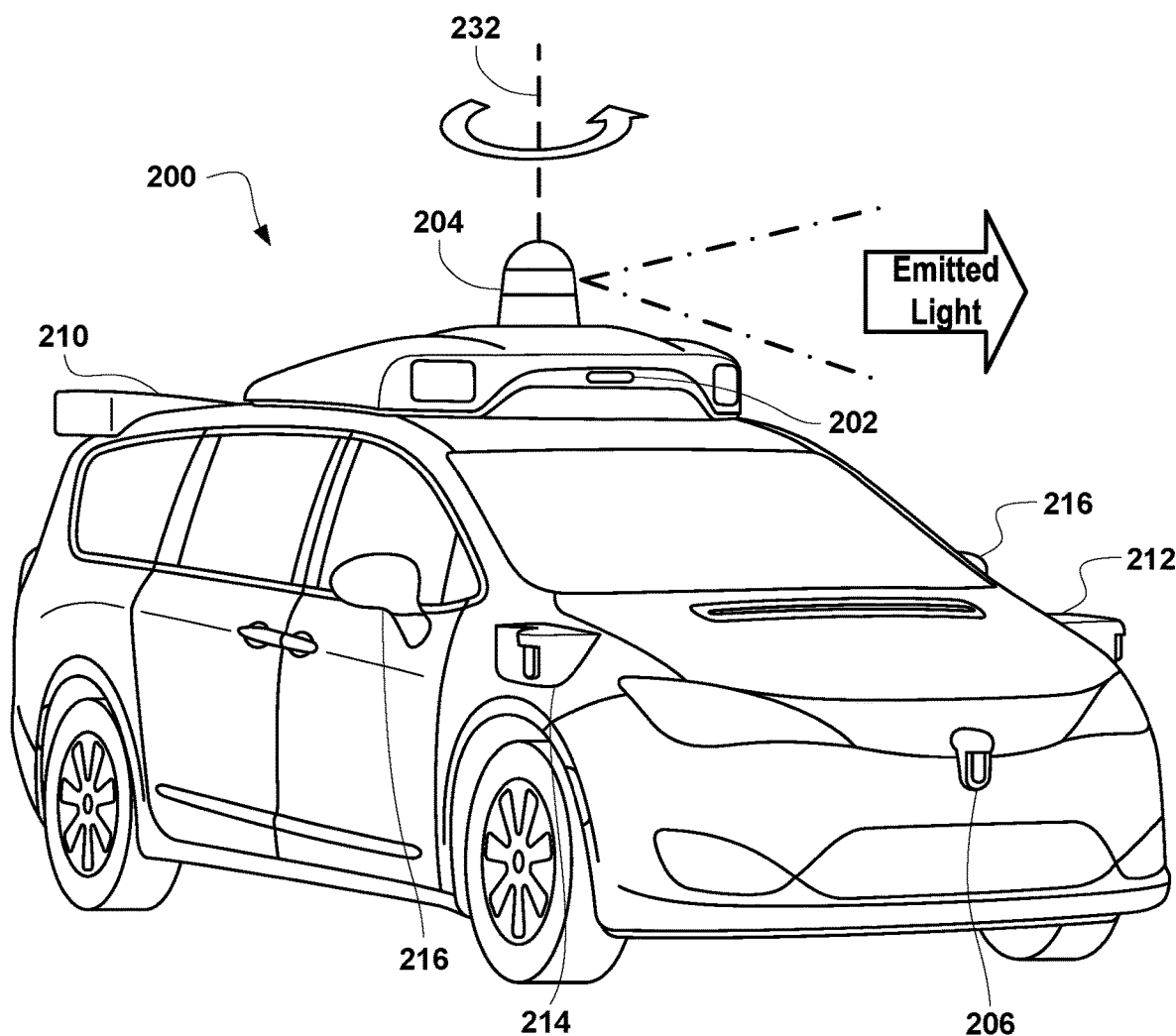
FIG. 4A illustrates an example operation of a lidar device, according to example embodiments.
Figure 4B:
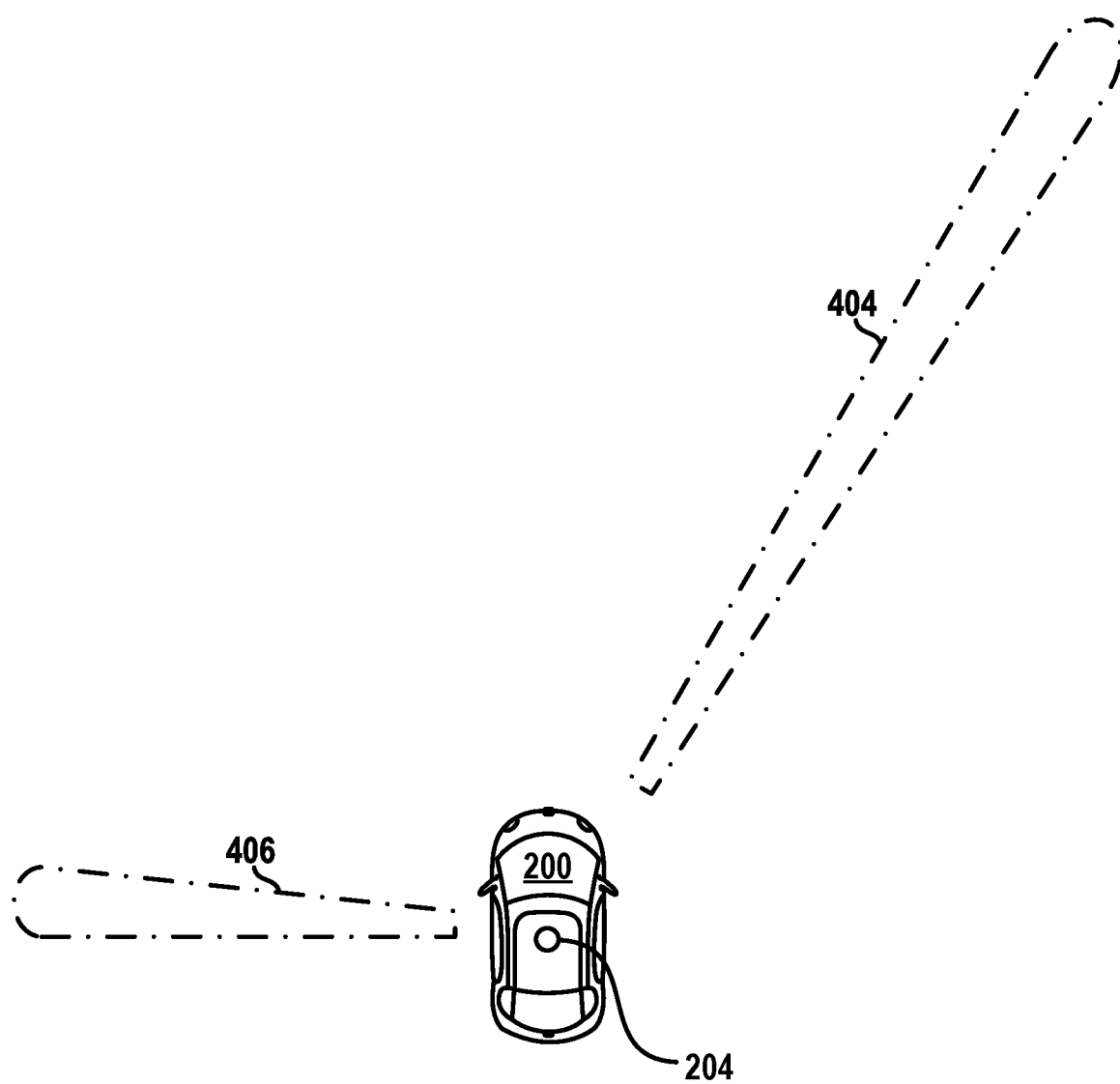
FIG. 4B illustrates example scanning ranges of a lidar device, according to example embodiments.

FIGS. 4A and 4B illustrate a vehicle (e.g., the vehicle 200 illustrated in FIGS. 2A-2E) equipped with a lidar device (e.g., the first lidar unit 204 illustrated in FIGS. 2A-2E), according to example embodiments. Although the vehicle 200 is illustrated as an automobile, as noted above, other types of vehicles are possible. Furthermore, although the vehicle 200 is shown as a vehicle that may be configured to operate in autonomous mode, the embodiments described herein are also applicable to vehicles that are not configured to operate autonomously.

FIG. 4A shows that the first lidar unit 204 may be configured to scan an environment around the vehicle 200 by rotating about vertical axis 232 while emitting one or more light pulses and detecting reflected light pulses off objects in an environment of the vehicle 200, for example.

Thus, as shown, the first lidar unit 204 may emit light in a pointing direction of the first lidar unit 204, which is shown in FIG. 4A as a pointing direction toward a right side of the page for example. With this arrangement, the first lidar unit 204 can emit light toward regions of the environment that are relatively close to the vehicle 200 (e.g., a lane marker) as well as toward regions of the environment that are further away from the vehicle (e.g., a road sign ahead of the vehicle). Further, the vehicle 200 can rotate the first lidar unit 204 (or one or more components thereof) about axis 232 to change the pointing direction of the first lidar unit 204. Thus, for each complete rotation of the first lidar unit 204 (or one or more components thereof), the first lidar unit 204 can scan a 360° FOV around the vehicle 200.

FIG. 4B illustrates the vehicle 200 the scanning range of the first lidar unit 204 at two different pointing directions of the first lidar unit 204, according to example embodiments. In line with the discussion above, example implementations herein may involve dynamically controlling various scanning parameters of the first lidar unit 204 (e.g., scanning resolution, scanning range, scanning refresh rate, etc.) for a given pointing direction of the first lidar unit 204. For example, in a first pointing direction, the first lidar unit 204 can be configured to emit light pulses having a relatively high light intensity. As a result, the emitted light pulses may reflect from distant objects (i.e., high scanning range) and reflect back to the first lidar unit 204 with a sufficiently high intensity to be detected by the first lidar unit 204, thereby allowing the first lidar unit 204 to detect the distant objects. This is illustrated in FIG. 4B by contour 404. For example, objects inside of contour 404 may be within a range of distances suitable for proper detection/identification.

As another example, when the first lidar unit 204 is rotated to a second pointing direction, the first lidar unit 204 can be configured to emit light pulses having a relatively lower light intensity, which may result in reflections off the distant objects being less detectable, thereby effectively reducing the scanning range of the first lidar unit 204. This is illustrated in FIG. 4B by contour 406. As shown, contour 406 may extend a shorter distance from the vehicle 200, and may thus define a region of the environment where objects are at a suitable range of distances for proper detection/identification using the lower intensity light pulses emitted in the second pointing direction. It is noted that these contours are not to scale but are illustrated as shown for convenience of description.

Although not shown, other types of modulation schemes for the emitted light pulses are also possible. For example, to apply a different respective refresh rate of the first lidar unit 204, in the first pointing direction (i.e., contour 404) relative to the second pointing direction (i.e., contour 406), the first lidar unit 204 can emit one light pulse in the first pointing direction for every complete rotation of the first lidar unit 204 about axis 232, and for every two complete rotations of the first lidar unit 204 about axis 232. By doing so, for instance, the first pointing direction can be assigned a higher refresh rate than the second pointing direction. As another example, to apply a different respective horizontal scanning resolution, the first lidar unit 204 can be configured to emit light pulses at a different pulse rate (e.g., number of pulses per second) when the first lidar unit 204 is oriented in the first pointing direction than a pulse rate applied when the first lidar unit 204 is oriented in the second pointing direction.

Some embodiments may include a lidar device 520 (e.g., the first lidar unit 204 illustrated in FIGS. 2A-4B). The lidar device 520 may be attached to a vehicle 500 (e.g., an autonomous vehicle, such as the vehicle 100 illustrated in FIG. 1 or the vehicle 200 illustrated in FIGS. 2A-4B). For example, the vehicle 500 may use the lidar device 520 to scan a surrounding environment to perform object detection and avoidance. Such a lidar device 520 may include an array of light emitters and a corresponding array of detectors, where the light emitters emit light signals toward an environment surrounding the lidar device 520 and the detectors detect reflections of the emitted light signals from objects in the environment surrounding the lidar device 520. Based on the time delay between the emission time and the detection time, a distance to an object in the environment may be determined. In order to identify the distance to multiple objects in the environment, the lidar device 520 may include one or more actuators that are configured to rotate the light emitters and detectors (e.g., in an azimuthal direction and/or elevation direction). For example, the actuators may azimuthally rotate the light emitters and detectors such that a 360° field of view is observed. As the actuator(s) rotate the light emitters and detectors, distances to different regions of the surrounding environment may be determined by emitting and detecting a series of light signals. Such distances may be amalgamated into a point cloud (e.g., a three-dimensional point cloud) that represents the surrounding environment. The point cloud may be generated on-board by the lidar device 520 or another on-board computing device from the determined distances. Additionally or alternatively, the point cloud may be generated using a separate computing device (e.g., a networked computing device, such as a server device) from the determined distances.

In alternate embodiments, the light emitters and detectors may be arranged (e.g., azimuthally) in such a way as to enable a 360° field of view to be observed without rotating the light emitters and detectors. In such embodiments, a 360° field of view may be observed using the lidar device 520 without using an actuator to rotate the light emitters and detectors.

It is understood that in alternate embodiments, the lidar device 520 may include a single light emitter with a corresponding array of detectors configured to detect light emitted by the single light emitter. In still other embodiments, the lidar device 520 may include an array of light emitters corresponding to a single detector. The single detector may be configured to detect light emitted by the array of light emitters. In yet other embodiments, the lidar device 520 may include a single light emitter and a corresponding single detector configured to detect light emitted by the single light emitter. In such embodiments, the single light emitter and the corresponding single detector may be rotated (e.g., by an actuator) to achieve a 360° azimuthal field of view and/or to achieve a 180° elevation field of view. In some embodiments, a rotating mirror may be used to redirect the light emitted from the emitter and/or received from the environment.

Figure 5A:
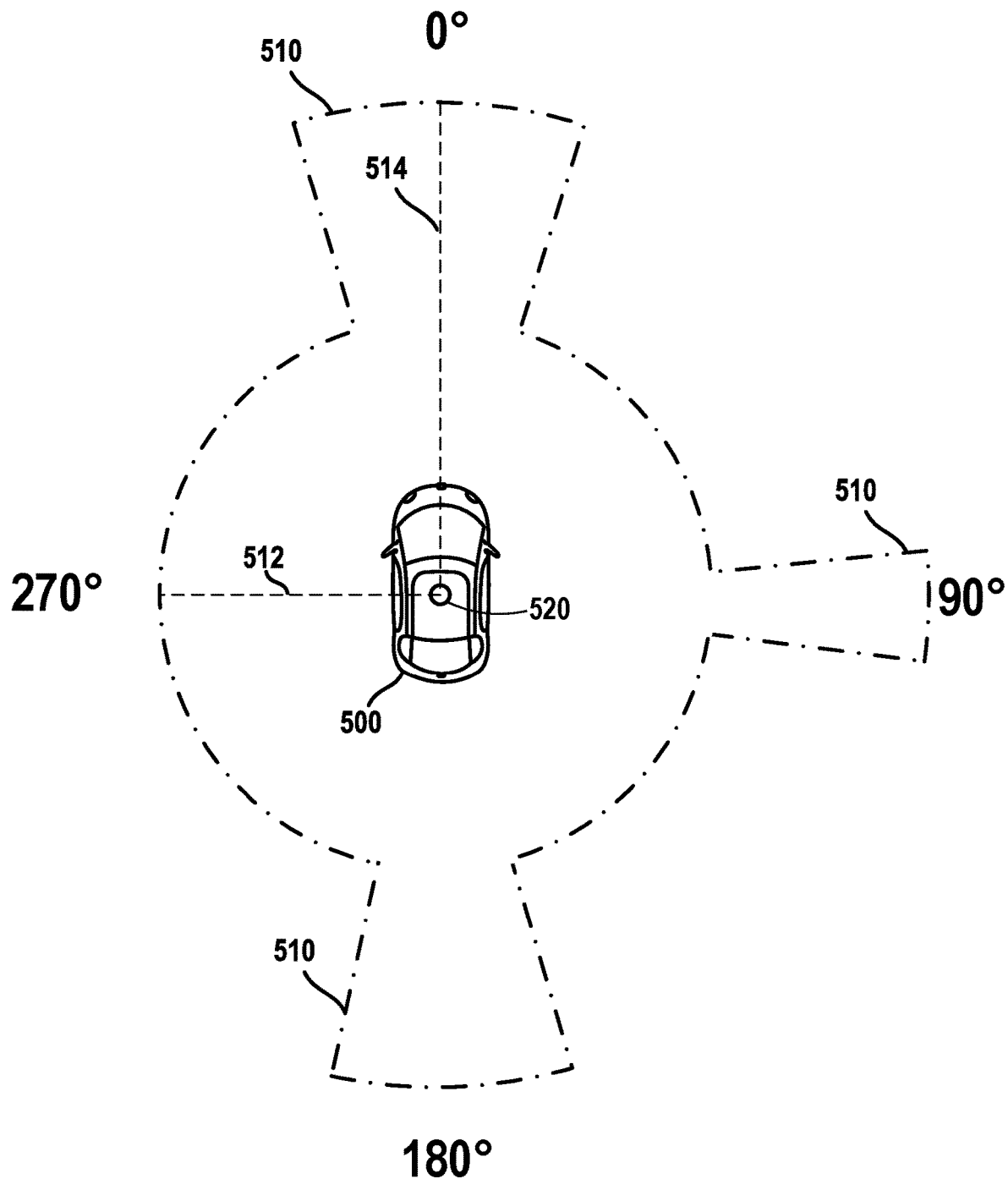
FIG. 5A is a schematic illustration of a pulse energy plan, according to example embodiments.

An example lidar device 520 attached to a vehicle 500 is illustrated in FIG. 5A. As shown, the lidar device 520 may azimuthally sweep out a 360° field of view. Due to inefficiencies in light emitters and detectors, though, some power may be wasted when performing distance detections using time of flight of light signals. For example, if the light emitters include laser diodes, such laser diodes may generate excess heat due to inefficiencies. Excess heat can cause degradation of lidar device 520 components (e.g., could lead to the melting of one or more optics or computing devices within the lidar device 520). As a result, it can be beneficial to reduce the amount of power used to generate the light signals. Lower input power, however, can correspond to lower output power (i.e., optical power of output light signals). Due to attenuation during flight of the light signals (e.g., due to dust or other substances in the surrounding environment), if light signals emitted by the lidar device 520 have lower optical power, the effective distance at which the lidar device 520 can detect objects may correspondingly decrease. Hence, there can exist an optimization problem between preventing unwanted heating from being generated within the lidar device 520 and maximizing effective detectable range of the lidar device 520.

One technique for addressing such an optimization problem is presented herein by identifying a thermal budget and distributing excitation power for the light emitters based on the thermal budget. A thermal budget may be determined by a controller of the lidar device 520 (e.g., based on a maximum amount of energy that can be used to generate light signals before damaging effects begin to occur within the lidar device 520). Then, based on the thermal budget, the controller may determine a pulse energy plan according to which the light emitters emit light signals. The term "pulse energy plan" as used herein and in the claims may describe the power, energy, and/or related measure used by the controller in any firing sequence or portion of a firing sequence to control one or more of the light emitters. For example, a "pulse energy plan" could be as simple as a charging time and/or charging energy for a single capacitor used to fire a single light emitter within a lidar device one time. Alternatively, an example "pulse energy plan" may include a series of waveforms, each waveform corresponding to the energy and timing used to fire a corresponding light emitter within an array of light emitters of the lidar device within a single observation period (e.g., within a single 360° azimuthal rotation of the lidar device relative to the surrounding environment). Further, "pulse energy plans" may be stored within memories and used in run-time and/or computed, used to fire one or more light emitters, and then discarded immediately thereafter. It is understood that the term "pulse energy plan" is meant to capture a broad range of possible control schemes and information within those control schemes, as described throughout this disclosure. The pulse energy plan may incorporate one or more regions of interest in the environment surrounding the lidar device 520. For example, based on previous measurements (e.g., from auxiliary sensors of the vehicle 500), it may be determined that only specific regions of the scene surrounding the vehicle 500 include objects separated from the lidar device 520 by more than a threshold distance. Those specific regions may constitute identified regions of interest. Hence, when the lidar device 520 is scanning regions outside of the regions of interest, a lower pulse energy level may be used for the light emitters than when the lidar device 520 is scanning the regions of interest.

It is understood that the regions of interest may be identified in a variety of ways in addition to or instead of using previous measurements (e.g., from auxiliary sensors of the vehicle 500). In some embodiments, control systems of the vehicle 500 may indicate the location of one or more regions of interest. For example, if the vehicle 500 is turning left or changing lanes, the regions of interest may be adjusted to accommodate such a maneuver (e.g., additional regions of interest may be allocated to the left side of the vehicle 500). Similarly, when a vehicle 500 is driving reverse instead of forward, the number of and/or angular range of regions of interest may change.

For illustrative purposes in FIG. 5A, there are three regions of interest 510. When an optical system (e.g., which includes light emitters and detectors) of the lidar device 520 is azimuthally oriented (e.g., by one or more actuators of the lidar device 520) such that light signals will be emitted to regions other than the regions of interest 510, the pulse energy plan may provide that a first pulse energy level 512 is used to emit light signals from the light emitters. As such, the controller may cause the light emitters to emit light signals using the first pulse energy level 512 when the optical system is azimuthally oriented away from the regions of interest 510 (e.g., by modulating the charging time, charging voltage, and/or charging current used to charge one or more capacitors used by the light emitters to generate light signals). In addition, when the optical system of the lidar device 520 is azimuthally oriented such that light signals will be emitted toward the regions of interest 510, the pulse energy plan may provide that a second pulse energy level 514 is used to emit light signals from the light emitters. As such, the controller may cause the light emitters to emit light signals using the second pulse energy level 514 when the optical system is azimuthally oriented toward from the regions of interest 510 (e.g., by modulating the charging time, charging voltage, and/or charging current used to charge one or more capacitors used by the light emitters to generate light signals). The second pulse energy level 514 may be higher than the first pulse energy level 512 and may correspond to an effective range that is greater than the first pulse energy level 512. In some embodiments, for example, the second pulse energy level 514, when combined with the duty cycle of the light emitters, may correspond to a continuous light emitter power between 10.0 Watts and 15.0 Watts and the first pulse energy level 512, when combined with the duty cycle of the light emitters, may correspond to a continuous light emitter power between 2.0 Watts and 4.0 Watts.

While the lidar device 520 in FIG. 5A is scanning azimuthally about the vehicle 500, it is understood that in other embodiments the lidar device could equally be scanning elevationally and/or both elevationally and azimuthally. Further, it is also understood that there may be greater or fewer than the three regions of interest 510 illustrated in FIG. 5A, the regions of interest 510 could located at different azimuthal angles than illustrated in FIG. 5A, and/or the angular range spanned by the regions of interest 510 may be different than illustrated in FIG. 5A.

Figure 5B:
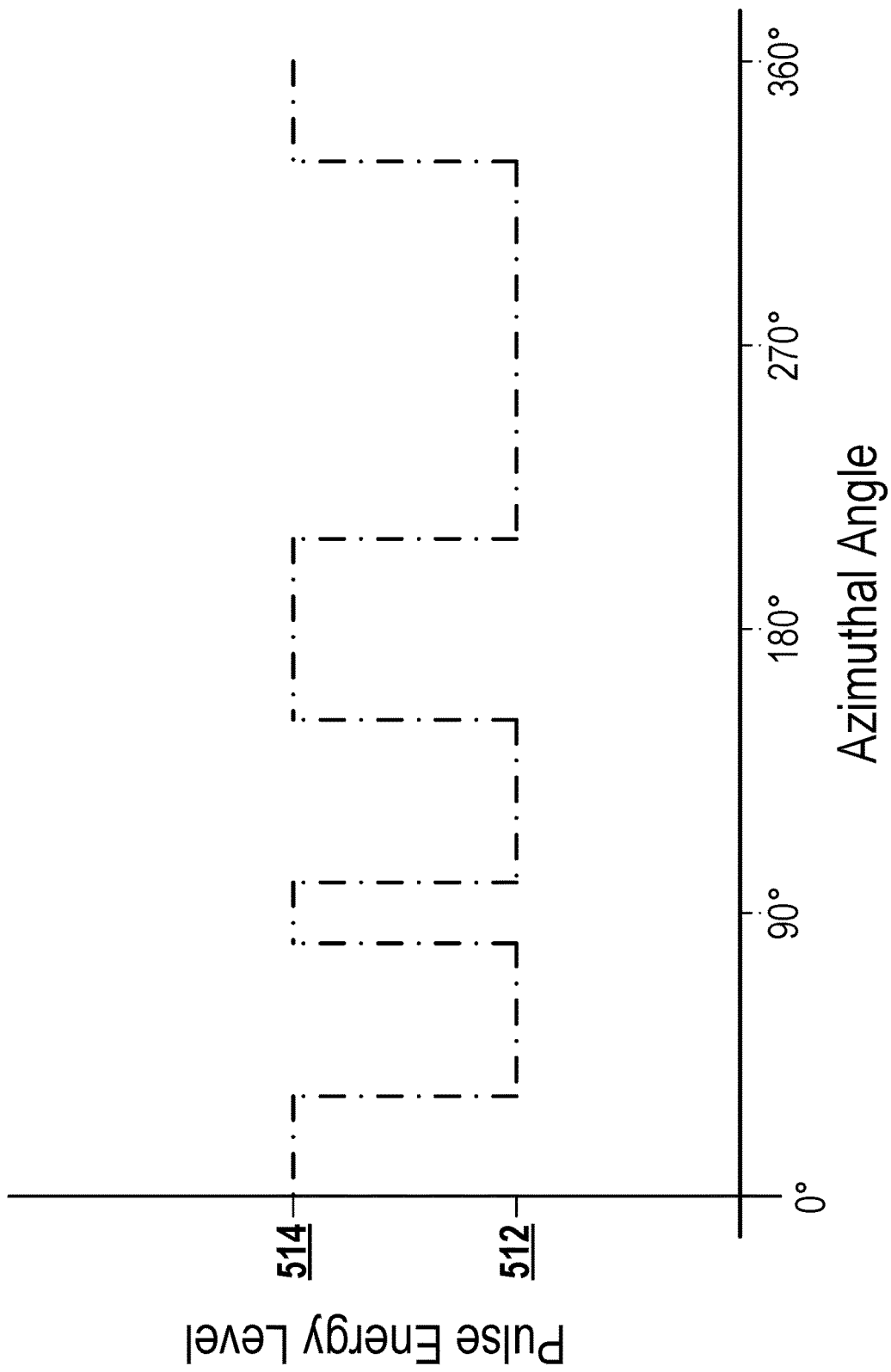
FIG. 5B is a plot of a pulse energy plan, according to example embodiments.

FIG. 5B is a plot that illustrates the pulse energy levels of the light emitters of the lidar device of FIG. 5A with respect to the azimuthal angle of the optical system of the lidar device. As indicated in FIG. 5A, the light emitters alternate between a first pulse energy level 512 and a second pulse energy level 514 with respect to azimuthal angle according to the pulse energy plan. It is understood that other numbers of pulse energy levels, angular ranges of pulse energy levels, and/or intensities of pulse energy levels may be present in alternate embodiments and are contemplated herein. FIGS. 5A and 5B are provided solely as examples. Further, it is also understood that, while a discrete number of pulse energy levels (e.g., two pulse energy levels) are illustrated herein, a continuum of pulse energy levels could also be used in the pulse energy plan. Such a continuum could allow for enhanced precision when it comes to tuning the range probed by the lidar device 520 for different regions of interest.

In some embodiments, pulse energy levels within a pulse energy plan may be distributed across multiple elevation angles. For example, an actuator of the lidar device 520 may additionally or alternatively be configured to rotate the optical system of the lidar device 520 about the elevation axis such that elevation angles are swept out. Some range of the elevation angles may constitute a region of interest, thereby warranting a higher pulse energy level than the elevation angles that lie outside the region of interest.

Figure 6A:
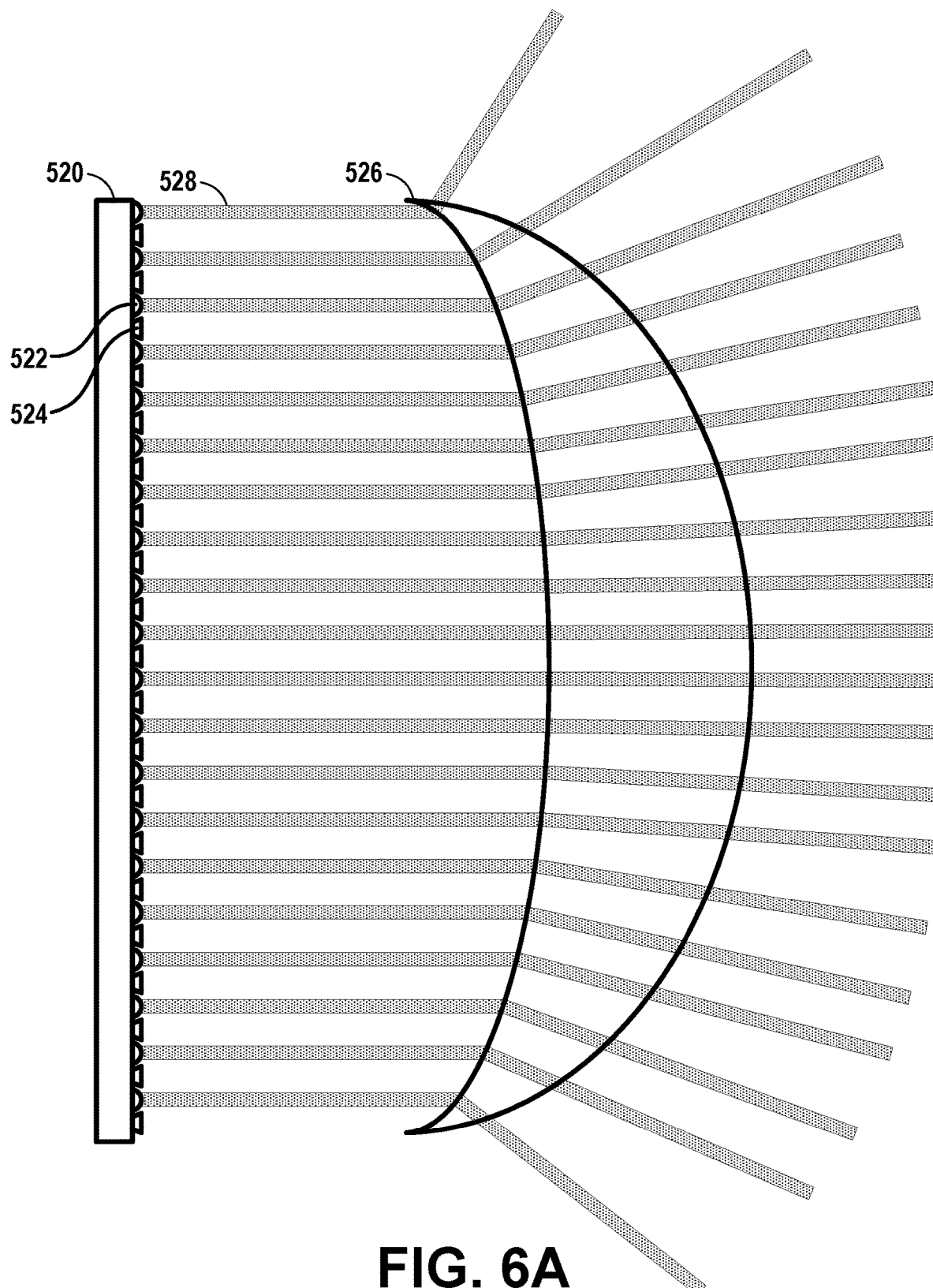
FIG. 6A is an illustration of a lidar device, according to example embodiments.

Additionally or alternatively, even without an actuator that rotates the optical system of the lidar device 520 about an elevation axis, the lidar device 520 may include an optical system that itself projects light signals in various elevation directions. For example, as illustrated in FIG. 6A, the lidar device 520 may include an optical system that includes a plurality of light emitters 522 and a corresponding plurality of detectors 524. The light emitters 522 may be configured to emit light signals 528 toward a shared lens 526. The shared lens 526 is illustrated in FIG. 6A as a single meniscus lens, but it is understood that other shared lens arrangements are also possible. For example, a series of cascaded lenses may be used (e.g., a series of cascaded lenses organized such that telecentricity is achieved). As illustrated, the shared lens 526 may distribute the light signals 528 emitted by the plurality of light emitters 522 to different elevation angles. It is understood that in other embodiments, the shared lens 526 could be designed in such a way to additionally or alternatively distribute light signals 528 to different azimuthal angles.

Each of the light emitters 522 may be independently controllable (e.g., by a firing circuit). For example, a corresponding capacitor may be charged and then subsequently discharged across one of the light emitters 522 to illuminate the light emitter 522. Capacitors associated with different light emitters 522 may be chargeable and/or dischargeable independently of one another. In some embodiments, the light emitters 522 may be arranged into subsets within the plurality. For example, arrangements of eight light emitters 522 may be grouped together such that the eight light emitters 522 are jointly controlled (e.g., a firing circuit controlled by a controller of the lidar device 520 can cause the eight light emitters 522 to simultaneously emit light). Each of the groupings may be controlled independently of each of the other groupings, even if each of the individual light emitters 522 within a given group cannot be independently controlled. It is understood that other arrangements for controlling the light emitters 522 are also possible.

Figure 6B:
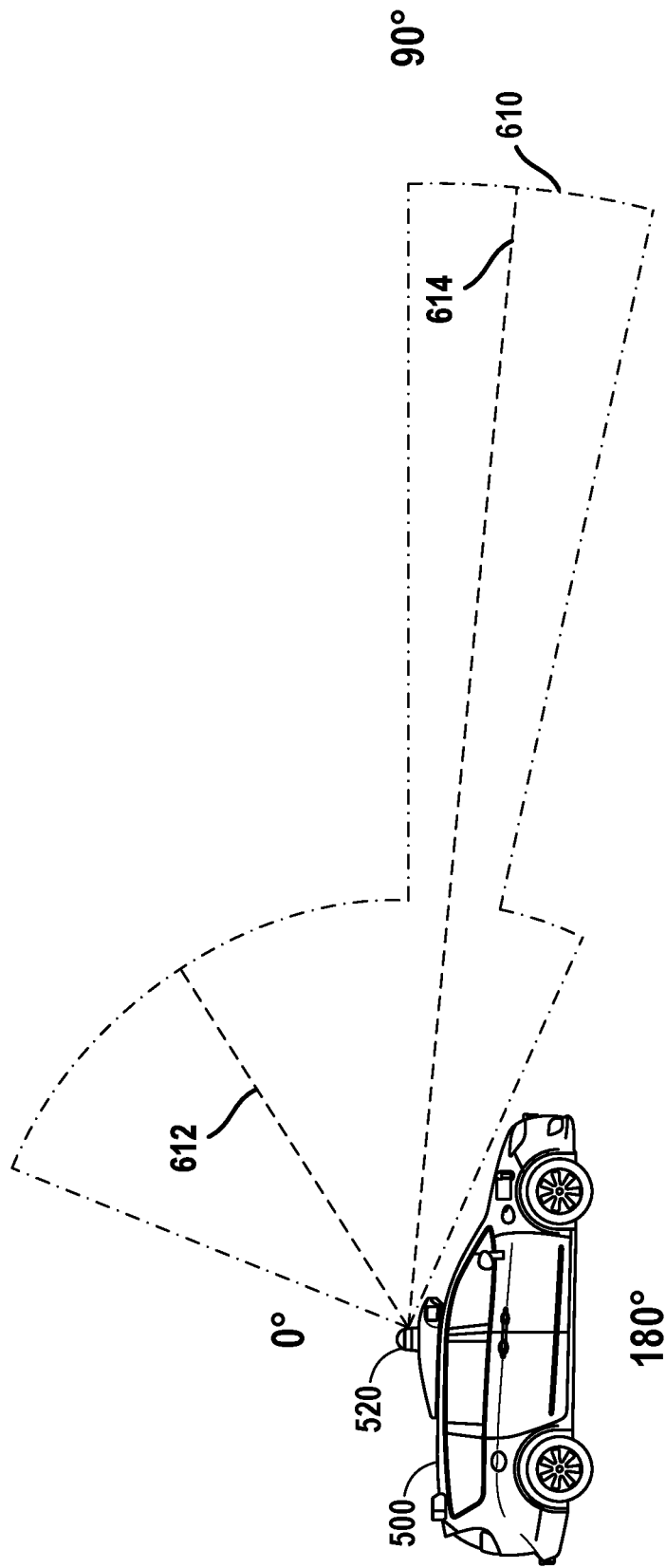
FIG. 6B is a schematic illustration of a pulse energy plan, according to example embodiments.

In embodiments where individual light emitters 522 or subsets of light emitters 522 can be independently controlled, different pulse energies may be supplied to the different light emitters 522 according to a pulse energy plan. For example, a first subset of the light emitters 522 in FIG. 6A could be provided with a first pulse energy level and a second subset of the light emitters 522 in FIG. 6A could be provided with a second pulse energy level. In this way, different elevation regions of the surrounding environment that are illuminated by different light emitters 522 could be sampled using different pulse energy levels (e.g., different angular regions could be sampled at different ranges based on the pulse energy level). As illustrated in FIG. 6B (not to scale), for example, an elevation region of interest 610 may be defined. While shown as being 90° and below in the drawing, the elevation region of interest may be defined in other ways, such as between 90° and 120°, or approximately at the road horizon or approximately at the locations of overhead signs, signals, and/or overpasses. In other embodiments, there may be multiple elevation regions of interest 610 (e.g., similar to the multiple azimuthal regions of interest 510 illustrated in FIG. 5A). Similar to FIG. 5A, the light emitters 522 (e.g., as illustrated in FIG. 6A) that are oriented such that they emit light signals 528 toward regions outside of the region of interest 610 may use a first pulse energy level 612. Likewise, similar to FIG. 5A, the light emitters 522 (e.g., as illustrated in FIG. 6A) that are oriented such that they emit light signals 528 toward the region of interest 610 may use a second pulse energy level 614. The second pulse energy level 614 may be greater than the first pulse energy level 612, for example. As such, the second pulse energy level 614 may correspond to an effective range that is greater than the first pulse energy level 612. In some embodiments, the second pulse energy level 614, when combined with the duty cycle of the light emitters 522, may correspond to a continuous light emitter power between 10.0 Watts and 15.0 Watts and the first pulse energy level 512, when combined with the duty cycle of the light emitters 522, may correspond to a continuous light emitter power between 2.0 Watts and 4.0 Watts.

FIG. 6C is a plot that illustrates the pulse energy levels of the light emitters of the lidar device 520 of FIG. 6B with respect to the elevation angle of the optical system of the lidar device 520. As indicated in FIG. 6B, the light emitters 522 alternate between a first pulse energy level 612 and a second pulse energy level 614 with respect to elevation angle according to the pulse energy plan. It is understood that other numbers of pulse energy levels, angular ranges of pulse energy levels, and/or intensities of pulse energy levels may be present in alternate embodiments and are contemplated herein. FIGS. 6B and 6C are provided solely as examples. As described above, it is also understood that, while a discrete number of pulse energy levels (e.g., two pulse energy levels) are illustrated herein, a continuum of pulse energy levels could also be used in the pulse energy plan. Such a continuum could allow for enhanced precision when it comes to tuning the range probed by the lidar device 520 for different regions of interest.

The thermal budget used to determine the pulse energy plans of the foregoing figures may be based on a variety of factors. In some embodiments, the thermal budget may be based on ambient temperature or the efficiency of the light emitters in the lidar device 520. For example, when it is colder outside the lidar device 520, there may be increased thermal headroom to take advantage of before the lidar device 520 components begin to perform in an undesirable manner. As such, the thermal budget may be larger, which may allow for a greater number of regions of interest, a greater angular range (azimuthal and/or elevation) for one or more of the regions of interest, and/or a greater pulse energy level within the regions of interest. Additionally, when it is colder outside the lidar device 520, it may be beneficial to utilize the larger thermal budget to improve emission stability of the light emitters.

In some embodiments, the light emitters may include one or more lasers (e.g., laser diodes). Laser output (e.g., output wavelength) may be sensitive to temperature fluctuations. Thus, it can be desirable to maintain a fairly constant laser temperature throughout operation to maintain consistency. One technique to maintain laser temperature during operation is to employ thermoelectric heaters and/or coolers. Additionally or alternatively, though, the excess energy generated by the laser (e.g., which can correspond to the thermal budget) may be used to heat the laser. Hence, it can be beneficial to utilize more of the thermal budget (e.g., drive the light emitters at higher power for longer durations) and/or to increase the thermal budget to heat the light emitters to maintain a consistent light-emitter temperature. Utilizing the thermal budget in this way could augment and/or replace the use of thermoelectric heaters in certain ambient temperature conditions (e.g., when it is cold, such as when the ambient temperature is below 0° C.).

Figure 5C:
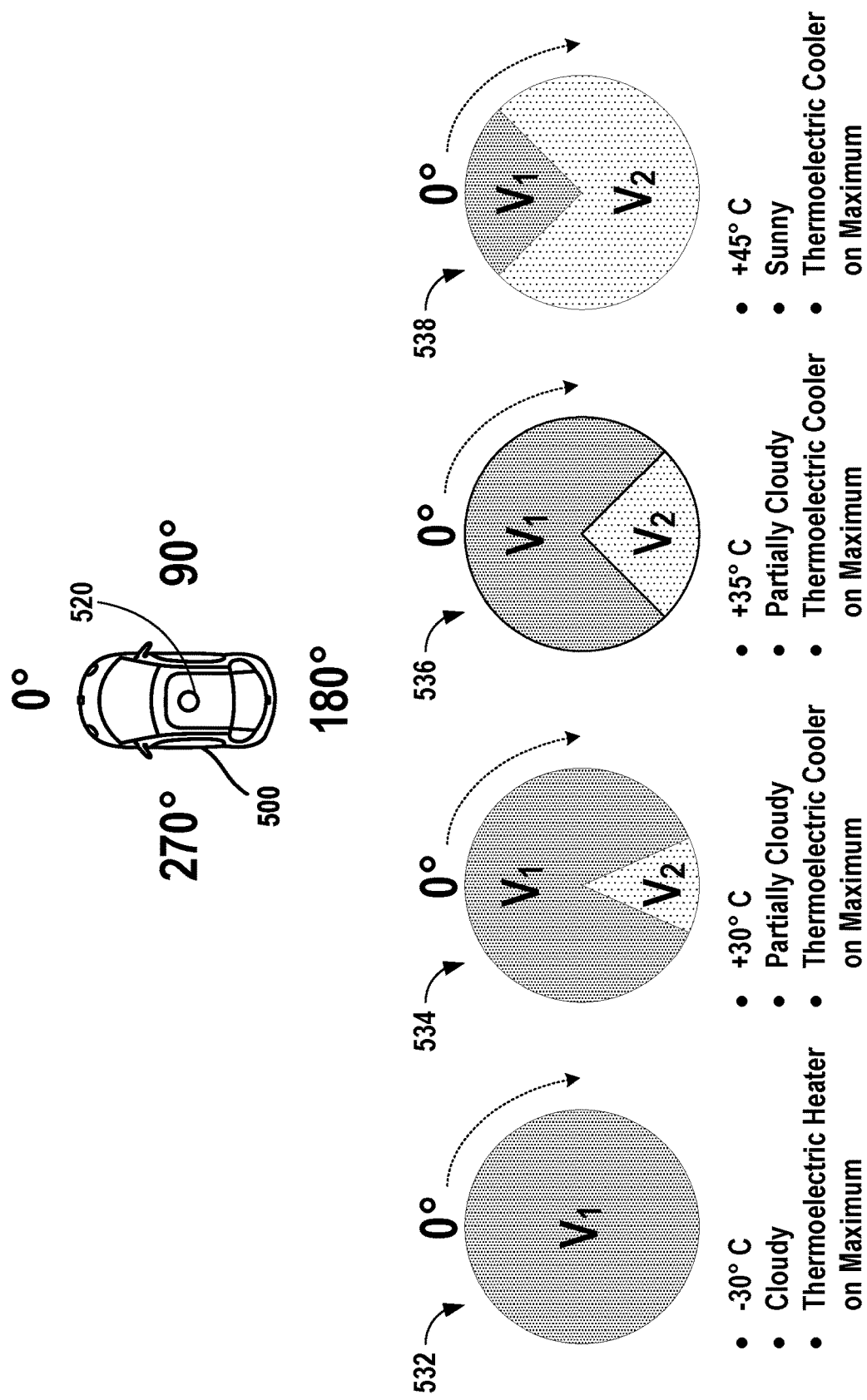
FIG. 5C is a schematic illustration of four pulse energy plans, according to example embodiments.

FIG. 5C illustrates example pulse energy plans 532, 534, 536, 538 based on differing environmental conditions (e.g., different ambient temperatures and cloud coverages). The pulse energy plans 532, 534, 536, 538 illustrated in FIG. 5C may also be based on the status of a thermoelectric heater and/or thermoelectric cooler being engaged within the lidar device 520. As illustrated in the first pulse energy plan 532 of FIG. 5C and described above, when the ambient temperature is low (e.g., approximately −30° C.), it is cloudy, and a thermoelectric heater of the lidar device 520 is on a maximum heat setting, a higher voltage $V_1$ (e.g., between approximately 15 Volts and approximately 20 Volts) may be used to fire one or more light emitters 522 within the lidar device 520 for all azimuthal angles of the lidar device 520. Using this increased firing voltage $V_1$ may improve stability of the light emitters 522 (e.g., laser diodes) by maintaining operating temperature of the light emitters 522 despite the cold ambient temperatures, as described herein. In addition to or instead of a higher firing voltage $V_1$, an increased charging time may be used to charge capacitors used to fire the light emitters 522 for all azimuthal angles within the first pulse energy plan 532.

The second, third, and fourth pulse energy plans 534, 536, 538, however, may use a lower firing voltage $V_2$ (e.g., between approximately 10 Volts and approximately 15 Volts) for all or a portion of the azimuthal angles. Using the lower firing voltage $V_2$ may be done in accordance with a lower thermal budget based on the ambient temperature or cloud cover. For example, the second pulse energy plan 534 may use the lower firing voltage $V_2$ for azimuthal angles between approximately 160° and approximately 200° and the higher firing voltage $V_1$ for azimuthal angles between approximately 0° and approximately 160° and between approximately 200° and approximately 360°. The second pulse energy plan 534 may be employed when the ambient temperature is approximately +30° C., there is partial cloud cover, and a thermoelectric cooler of the lidar device 520 is on a maximum cool setting, for example. As another example, the third pulse energy plan 536 may use the lower firing voltage $V_2$ for azimuthal angles between approximately 135° and approximately 225° and the higher firing voltage $V_1$ for azimuthal angles between approximately 0° and approximately 135° and between approximately 225° and approximately 360°. The third pulse energy plan 536 may be employed when the ambient temperature is approximately +35° C., there is partial cloud cover, and a thermoelectric cooler of the lidar device 520 is on a maximum cool setting, for example. As yet another example, the fourth pulse energy plan 538 may use the lower firing voltage $V_2$ for azimuthal angles between approximately 45° and approximately 315° and the higher firing voltage $V_1$ for azimuthal angles between approximately 0° and approximately 45° and between approximately 315° and approximately 360°. The fourth pulse energy plan 538 may be employed when the ambient temperature is approximately +45° C., it is sunny, and a thermoelectric cooler of the lidar device 520 is on a maximum cool setting, for example.

While the pulse energy plans 532, 534, 536, 538 described above may prioritize higher firing voltages for azimuthal regions in front of the vehicle 100 (e.g., regions between 0° and 45° and between 315° and 360°), this is only shown by way of example. It is understood that in other embodiments other distributions of firing voltages and/or regions of interest are also possible. Alternate distributions of firing voltages and/or regions of interest are possible for the environmental conditions listed in FIG. 5C, as well as other environmental conditions.

In addition to modulating the pulse energy level with respect to azimuthal and elevation orientation of the optical system, in some embodiments, the detectors 524 (e.g., silicon photomultipliers (SiPMS) or avalanche photodiodes (APDs)) may be debiased such that they stop performing detections altogether when the optical system is directed away from regions of interest. For example, in some applications it may not be necessary for the lidar device 520 or an associated computer system to generate a three-dimensional point cloud of certain regions of the environment (e.g., from 135° to 225° in azimuth). Hence, if the data points would not otherwise be used, the lidar device 520 may avoid additional inefficiencies by powering down the detectors 524 temporarily when the lidar device 520 is angularly oriented toward such regions.

As described above with reference to FIG. 6B, the light emitters 522 and/or detectors 524 may be oriented toward different portions of the surrounding environment than one another. As such, the light emitters 522 and/or detectors 524 may be spaced in such a way that each light emitter 522/detector 524 combination has a slightly different azimuthal orientation and/or elevation orientation. The pulse energy level for each of the light emitters 522 within the array may be defined separately within the pulse energy plan. This may allow different light emitters 522 within the lidar device 520 to be fired with different pulse energy levels at the same time, thereby enhancing the precision with which a region of interest can be targeted. In addition, the beam divergence (e.g., in azimuth and/or elevation) of the light emitters 522 may also be accounted for when determining the pulse energy plan.

III. Example Processes

Figure 7:
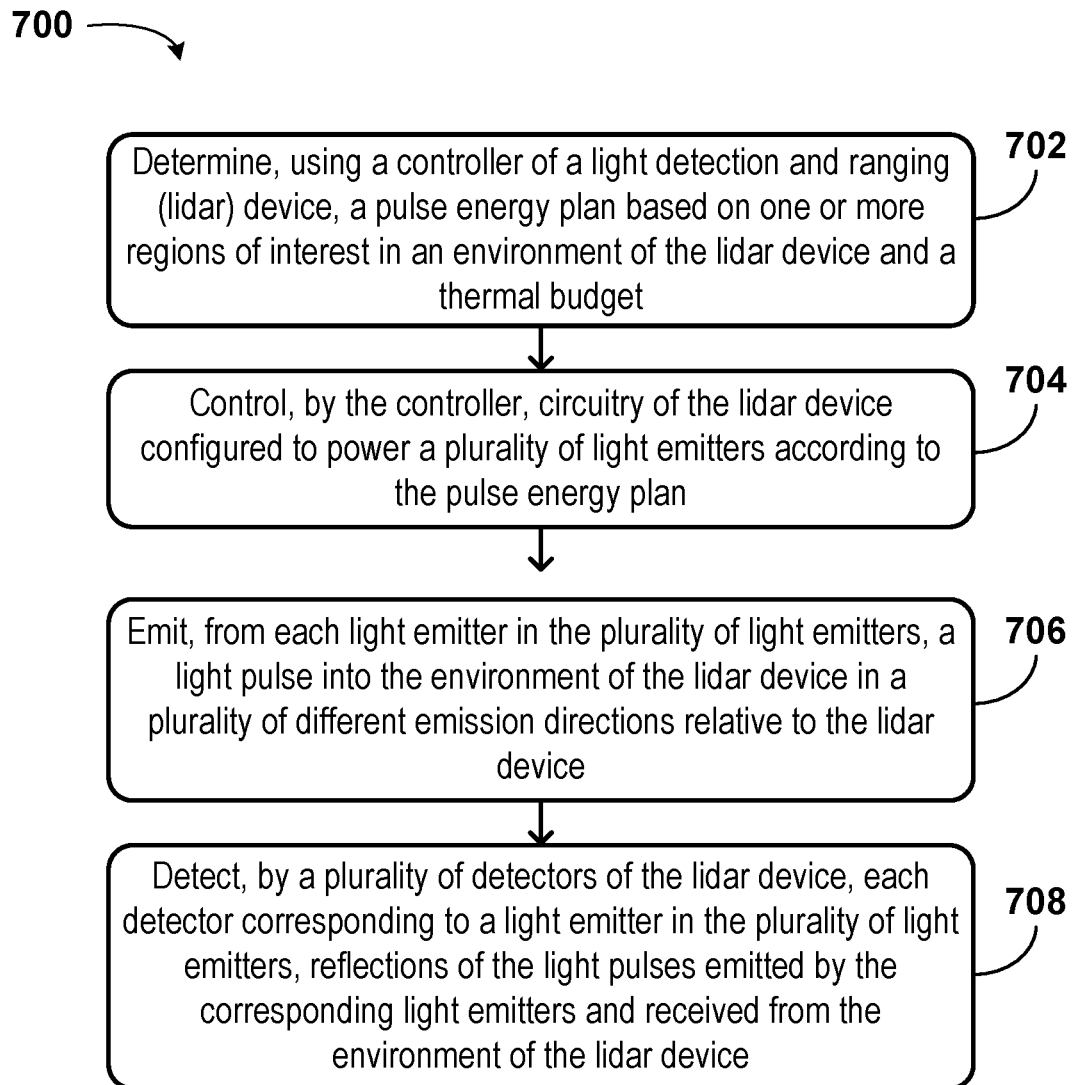
FIG. 7 is a flowchart illustration of a method, according to example embodiments.

FIG. 7 is a flowchart diagram of a method 700, according to example embodiments. In some embodiments, one or more blocks of FIG. 7 may be performed by a lidar device (e.g., a lidar device used in the autonomous vehicle 100 to perform object detection and avoidance).

At block 702, the method 700 may include determining, using a controller of a light detection and ranging (lidar) device, a pulse energy plan based on one or more regions of interest in an environment of the lidar device and a thermal budget. The thermal budget may be based on a temperature in the environment of the lidar device and/or one or more efficiencies of the light emitters. The one or more regions of interest may be based on map data (e.g., two-dimensional and/or three-dimensional map data), data from auxiliary sensors of the lidar device, a location of the horizon relative to a vehicle associated with the lidar device, weather conditions, a time of day, and/or driving conditions of a vehicle associated with the lidar device. The driving conditions of the vehicle associated with the lidar device may include a type of road on which the vehicle is driving (e.g., a freeway, a residential roadway, a highway, a gravel road, etc.), traffic signals or conditions (e.g., yellow traffic signal or light, moderate, heavy, standstill, etc.), an occurrence of an unprotected left or right turn (e.g., if the vehicle is making or about to make an unprotected left turn or yielding as it makes a right turn), historical driving data (e.g., prior traffic data or prior velocity data for given GPS locations), data from other vehicles in a vehicle fleet, and/or a location of a construction zone.

At block 704, the method 700 may include controlling, by the controller, circuitry of the lidar device configured to power a plurality of light emitters according to the pulse energy plan.

At block 706, the method 700 may include emitting, from each light emitter in the plurality of light emitters, a light pulse into the environment of the lidar device in a plurality of different emission directions relative to the lidar device. A pulse energy level for each light pulse emitted by each light emitter in the plurality of light emitters may be specified by the pulse energy plan.

At block 708, the method 700 may include detecting, by a plurality of detectors of the lidar device, each detector corresponding to a light emitter in the plurality of light emitters, reflections of the light pulses emitted by the corresponding light emitters and received from the environment of the lidar device.

In some embodiments, the method 700 may also include scanning, by an actuator of the lidar device, a pointing direction of the lidar device through a range of angles. Controlling the circuitry of the lidar device may include controlling the circuitry of the lidar device as the pointing direction of the lidar device is scanned through the range of angles by the actuator. Further, the different emission directions relative to the lidar device may include different emission directions relative to the pointing direction of the lidar device.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A light detection and ranging (lidar) device of a vehicle within a fleet of vehicles, wherein the lidar device comprises:
   a plurality of light emitters configured to emit light pulses into an environment of the lidar device in a plurality of different emission directions;
   circuitry configured to power the plurality of light emitters;
   a plurality of detectors, wherein each detector in the plurality of detectors is configured to detect reflections of light pulses emitted by a corresponding light emitter in the plurality of light emitters and received from the environment of the lidar device; and a controller configured to:
- determine one or more regions of interest in the environment of the lidar device based on data from other vehicles within the fleet;
- determine a pulse energy plan based on the one or more regions of interest and a thermal budget, wherein the pulse energy plan specifies a pulse energy level for each light pulse emitted by each light emitter in the plurality of light emitters; and
- control the circuitry based on the pulse energy plan.

2. The lidar device of claim 1, wherein the pulse energy plan specifies a pulse energy level for each light pulse from among at least a first pulse energy level and a second pulse energy level, and wherein the second pulse energy level is higher than the first pulse energy level.

3. The lidar device of claim 2, wherein the circuitry comprises a plurality of pulser circuits, and wherein each pulser circuit is configured to power a respective set of one or more light emitters in the plurality of light emitters.

4. The lidar device of claim 1, further comprising an actuator configured to scan a pointing direction of the lidar device through a range of angles by rotating the plurality of light emitters and the plurality of detectors about an axis of rotation, wherein the range of angles comprises a range of azimuthal angles about an axis of rotation.

5. The lidar device of claim 1, wherein the controller is further configured to determine the thermal budget based on a temperature in the environment of the lidar device.

6. The lidar device of claim 5, wherein the thermal budget is increased when the temperature in the environment is below a threshold ambient temperature, and wherein utilizing the increased thermal budget heats the light emitters to maintain a consistent light-emitter temperature.

7. The lidar device of claim 5, wherein the controller is further configured to determine the thermal budget based on a cloud cover in the environment of the lidar device or a status of a thermoelectric heater or thermoelectric cooler of the lidar device.

8. The lidar device of claim 1, wherein the controller is further configured to debias the at least one of the plurality of detectors when the pointing direction of the lidar device is outside of the range of angles.

9. The lidar device of claim 1, wherein the controller is further configured to determine the one or more regions of interest based on map data.

10. The lidar device of claim 1, wherein the controller is further configured to determine the one or more regions of interest based on data from auxiliary sensors of the lidar device.

11. The lidar device of claim 1, wherein the controller is further configured to determine the thermal budget based on one or more efficiencies of the light emitters.

12. The lidar device of claim 1, wherein the controller is further configured to determine the one or more regions of interest based on a location of the horizon relative to a vehicle associated with the lidar device.

13. The lidar device of claim 1, wherein the controller is further configured to determine the one or more regions of interest based on weather conditions.

14. The lidar device of claim 1, wherein the controller is further configured to determine the one or more regions of interest based on one or more driving conditions of a vehicle associated with the lidar device.

15. The lidar device of claim 14, wherein the driving conditions comprise a type of road on which the vehicle is driving, traffic signals, traffic conditions, an occurrence of an unprotected turn, historical driving data, data from other vehicles in a vehicle fleet, or a location of a construction zone.

16. The lidar device of claim 1, wherein the controller is further configured to determine the one or more regions of interest based on a time of day.

17. A method comprising:
- determining, by a controller of a light detection and ranging (lidar) device of a vehicle within a fleet of vehicles, one or more regions of interest in an environment of the lidar device based on data from other vehicles within the fleet;
- determining, by the controller, a pulse energy plan based on the one or more regions of interest and a thermal budget;
- controlling, by the controller, circuitry of the lidar device configured to power a plurality of light emitters according to the pulse energy plan;
- emitting, from each light emitter in the plurality of light emitters, a light pulse into the environment of the lidar device in a plurality of different emission directions relative to the lidar device, wherein a pulse energy level for each light pulse emitted by each light emitter in the plurality of light emitters is specified by the pulse energy plan; and
- detecting, by a plurality of detectors of the lidar device, each detector corresponding to a light emitter in the plurality of light emitters, reflections of the light pulses emitted by the corresponding light emitters and received from the environment of the lidar device.

18. The method of claim 17, further comprising scanning, by an actuator of the lidar device, a pointing direction of the lidar device through a range of angles,
- wherein controlling the circuitry of the lidar device comprises controlling the circuitry of the lidar device as the pointing direction of the lidar device is scanned through the range of angles by the actuator, and
- wherein the different emission directions relative to the lidar device comprise different emission directions relative to the pointing direction of the lidar device.

19. A non-transitory, computer-readable medium having instructions stored therein, wherein the instructions, when executed by a processor, perform a method comprising:
- determining, for a light detection and ranging (lidar) device of a vehicle within a fleet of vehicles, one or more regions of interest in an environment of the lidar device based on data from other vehicles within the fleet;
- determining a pulse energy plan based on the one or more regions of interest and a thermal budget;
- controlling circuitry of the lidar device configured to power a plurality of light emitters according to the pulse energy plan;
- causing each light emitter in the plurality of light emitters to emit a light pulse into the environment of the lidar device in a plurality of different emission directions relative to the lidar device, wherein a pulse energy level for each light pulse emitted by each light emitter in the plurality of light emitters is specified by the pulse energy plan; and
- receiving, from each detector in a plurality of detectors of the lidar device, signals corresponding to detected reflections of the light pulses emitted by the plurality of light emitters and received from the environment of the lidar device, wherein each detector of the plurality of detectors corresponds to a light emitter in the plurality of light emitters.

20. The non-transitory, computer-readable medium of claim 19,
wherein the method further comprises causing an actuator of the lidar device to scan a pointing direction of the lidar device through a range of angles,
wherein controlling the circuitry of the lidar device comprises controlling the circuitry of the lidar device as the pointing direction of the lidar device is scanned through the range of angles by the actuator, and
wherein the different emission directions relative to the lidar device comprise different emission directions relative to the pointing direction of the lidar device.

* * * * *